(12) United States Patent
Hsu et al.

(10) Patent No.: US 8,112,719 B2
(45) Date of Patent: Feb. 7, 2012

(54) METHOD FOR CONTROLLING GESTURE-BASED REMOTE CONTROL SYSTEM

(75) Inventors: Che-Hao Hsu, Taipei (TW); Shoei-Lai Chen, Taipei (TW)

(73) Assignee: Topseed Technology Corp., Taipei Hsien (TW)

( * ) Notice: Subject to any disclaimer, the term of this patent is extended or adjusted under 35 U.S.C. 154(b) by 290 days.

(21) Appl. No.: 12/471,792

(22) Filed: May 26, 2009

(65) Prior Publication Data

US 2010/0306699 A1    Dec. 2, 2010

(51) Int. Cl.
*G06F 3/033* (2006.01)
(52) U.S. Cl. .......................... 715/810; 715/863
(58) Field of Classification Search .................. 715/810, 715/863
See application file for complete search history.

(56) References Cited

U.S. PATENT DOCUMENTS

| | | | |
|---|---|---|---|
| 6,351,222 | B1 | 2/2002 | Swan |
| 2002/0071277 | A1 | 6/2002 | Starner |
| 2002/0097247 | A1 | 7/2002 | Ohba |
| 2007/0252898 | A1* | 11/2007 | Delean ............... 348/211.99 |
| 2008/0062125 | A1 | 3/2008 | Kitaura |
| 2009/0102800 | A1 | 4/2009 | Keenan |

* cited by examiner

*Primary Examiner* — Tadeese Hailu
*Assistant Examiner* — Darrin Hope
(74) *Attorney, Agent, or Firm* — Muncy, Geissler, Olds & Lowe, PLLC (57) ABSTRACT

A method for controlling a gesture-based remote control system (100) is provided to control a controlled electronic appliance by detecting an image of a user's gesture. A movement area in the image of the user's gesture detected. The user's gesture is judged as an adjusted gesture when the movement of the motion region is continual. The controlled electronic appliance is controlled by a key controlling command based on the adjusted gesture and sent by a wireless transmitter.

10 Claims, 11 Drawing Sheets

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 16 | 17 | 18 | 19 | 20 | 21 | 22 | 23 | 24 | 25 | 26 | 27 | 28 | 29 | 30 | 31 |
| 32 | 33 | 34 | 35 | 36 | 37 | 38 | 39 | 40 | 41 | 42 | 43 | 44 | 45 | 46 | 47 |
| 48 | 49 | 50 | 51 | 52 | 53 | 54 | 55 | 56 | 57 | 58 | 59 | 60 | 61 | 62 | 63 |
| 64 | 65 | 66 | 67 | 68 | 69 | 70 | 71 | 72 | 73 | 74 | 75 | 76 | 77 | 78 | 79 |
| 80 | 81 | 82 | 83 | 84 | 85 | 86 | 87 | 88 | 89 | 90 | 91 | 92 | 93 | 94 | 95 |
| 96 | 97 | 98 | 99 | 100 | 101 | 102 | 103 | 104 | 105 | 106 | 107 | 108 | 109 | 110 | 111 |
| 112 | 113 | 114 | 115 | 116 | 117 | 118 | 119 | 120 | 121 | 122 | 123 | 124 | 125 | 126 | 127 |
| 128 | 129 | 130 | 131 | 132 | 133 | 134 | 135 | 136 | 137 | 138 | 139 | 140 | 141 | 142 | 143 |
| 144 | 145 | 146 | 147 | 148 | 149 | 150 | 151 | 152 | 153 | 154 | 155 | 156 | 157 | 158 | 159 |
| 160 | 161 | 162 | 163 | 164 | 165 | 166 | 167 | 168 | 169 | 170 | 171 | 172 | 173 | 174 | 175 |
| 176 | 177 | 178 | 179 | 180 | 181 | 182 | 183 | 184 | 185 | 186 | 187 | 188 | 189 | 190 | 191 |

METHOD FOR CONTROLLING GESTURE-BASED REMOTE CONTROL SYSTEM

BACKGROUND OF THE INVENTION

1. Field of the Invention

The present invention relates to a method for controlling a remote control system, and more particularly to a method for controlling a gesture-based remote control system.

2. Description of Prior Art

It is inconvenient and complicated to operate many different home appliances by using different corresponding remote controls. Hence, many different key code information databases are built in the same remote control to operate varied home appliances whereby one remote control used with a mode switch key if enough for mode selection. Furthermore, some high-class remote controls are designed to emulate key codes of remote controls of different brands to overcome insufficiency of the key code information databases. However, it is inconvenient to operate the home appliances when users forget where the responding physical remote controls are placed.

SUMMARY OF THE INVENTION

In order to improve the disadvantages mentioned above, the prevent invention provides a method for controlling a gesture-based remote control system to control at least one controlled electronic appliance.

In order to achieve the objectives mentioned above, the method for controlling a gesture-based remote control system controls a controlled electronic appliance by detecting an image of a user's gesture. A movement area in the image of the user's gesture is detected. The user's gesture is judged as an adjusted gesture when the movement of the movement area is continual. The controlled electronic appliance is controlled by a key controlling command based on the adjusted gesture and sent by a wireless transmitter.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

As mentioned above, it is inconvenient to operate the home appliances when users forget where the responding physical remote controls are located. In order to solve the disadvantages mentioned above, the prevent invention provides a gesture-based remote control system without the physical remote control to operate the electrical appliances. The gesture-based remote control system provides a camera module to fetch different images of the user's gesture. The gesture images (the images of the user's gesture) are processed to generate control signals corresponded to buttons of the physical remote control, and the control signals are provided to control the electrical appliances. In more detailed description, an electronic appliance (such as a television) with an on-screen display (OSD) is provided to be the universal remote control. Many varied key codes of the various remote controls are imitated, or the key code databases are directly used by the universal remote control. Further, the contents of operation menus are directly displayed on a monitor, and the operation menus are operated to control various electronic appliances without using any physical remote controls.

Figure 14:
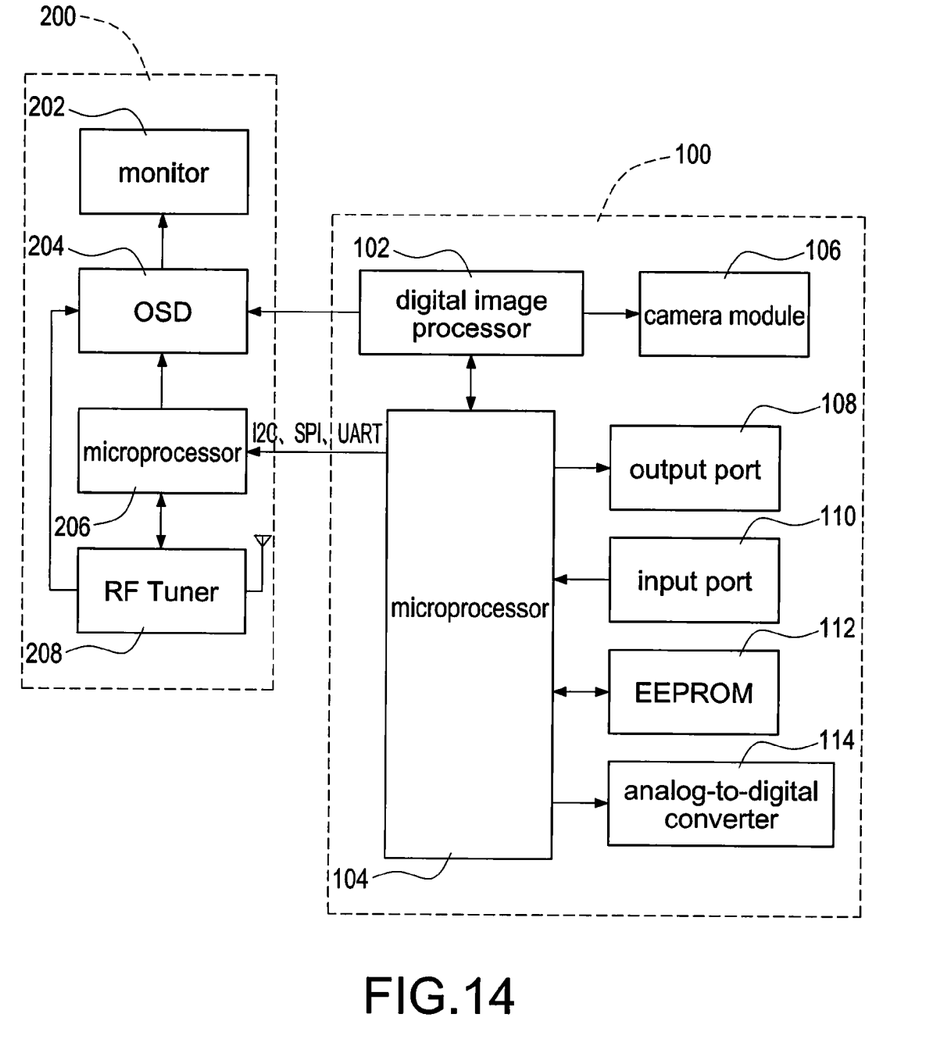
FIG. 14 is a block diagram of a gesture-based remote control system.

Reference is made to FIG. 14 which is a block diagram of a gesture-based remote control system to describe the controlling method is applied to the corresponding electronic appliances. The gesture-based remote control system 100 includes a digital image processor 102, a microprocessor 104, a camera module 106, an output port 108, a input port 110, an erasable programmable read-only memory (EEPROM) 112, and an analog-to-digital converter 114. The camera module 106 is electrically connected to the digital image processor 102. The microprocessor 104 is electrically connected to digital image processor 102, the output port 108, the input port 110, the EEPROM 112, and the analog-to-digital converter 114, respectively.

Firstly, a key code information sent from a remote control (not shown) of a controlled electronic appliance is received and imitated through the input port 110 (such as an infrared input port). Afterward, the key code information is interpreted and then stored in the erasable programmable read-only memory (EEPROM) 112. Besides the key code information, hundreds of known key code databases of the controlled electronic appliance can be stored in the EEPROM 112. Afterward, the image of the user's gesture (user's gesture image) is fetched by the camera module 106. The user's gesture image is recognized by the digital image processor 102 to obtain a control command, and the control command is sent to the microprocessor 104. The wireless transmitter 400 can send different kinds of IR or RF control commands to control the controlled electronic appliances according to types of the controlled electronic appliances. Furthermore, the control commands can be also sent to a television 200 by using different transmission interfaces (such as I2C, SPI, or UART). Besides digital signals, the microprocessor 104 can also send analog signals processed by the analog-to-digital converter 114 to the television 200. The digital image processor 102 sends video signals to television 200 to display them on the monitor 202 for showing operation messages during the operation process.

Figure 5:
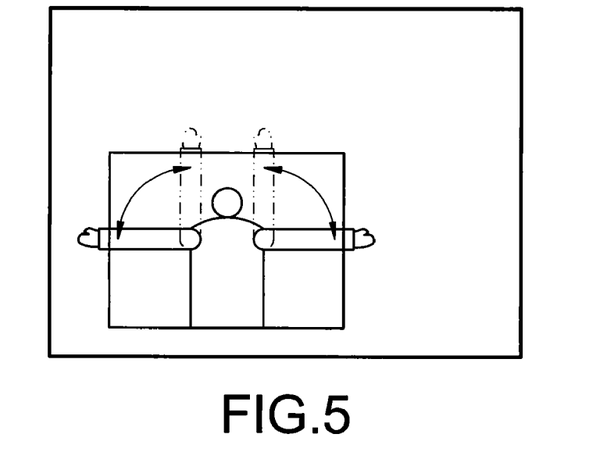
FIG. 5 is a schematic front view shows a position gesture of raising both arms outward and waving both arms upward and downward.
Figure 6:
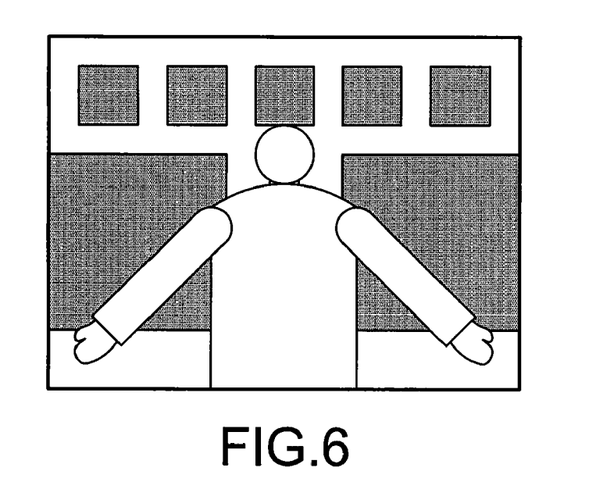
FIG. 6 is a schematic front view shows a location of the user and positions of imitated touched keys.

The gesture-based remote control system judges the user's gesture to a location gesture, a click gesture, a slide gesture, and a cancel gesture. The detailed description of the different gestures will be given as follows:

1. The location gesture. The universal imitated gesture-based remote control system has an electronic appliance (such as a television) with an on-screen display (OSD) function. Also, an operation menu is initially set in a disable state after starting up the gesture-based remote control system. Firstly, an optimal operation location for the user is automatically located, and a main menu is started and displayed on a monitor of the electronic appliance when the user raises both arms outward and waves both arms upward and downward (shown in FIG. 5). The operation locations of the imitated touched keys are located in four different locations. The first location is located over the head of the user, the second location is located both outer sides of the first location, the third location is located both outer sides of the second location, and the fourth location is located near right and left hands of the user (shown in FIG. 6). More particularly, function selection blocks are located in the first location, the second location, and the third location. Also, function adjustment blocks are located in the fourth location, and the function adjustment area are operated to switch (rotate) the operation menu or send function keys.

2. The click gesture. The click gesture is applied to the function selection area. A selection action is operated to click one time one of the imitated touched keys located in the function selection area. In addition, the selection action is canceled when one of the imitated touched keys is clicked again. Hence, the imitated touched keys are called toggle keys. Moreover, the present imitated touched key is automatically released when another imitated touched key is clicked. Hence, only one of the imitated touched keys is operated at the same time, which is similar to radio button in computer GUI menu.

3. The slide gesture. The slide gesture is applied to the function adjustment area. A right-side imitated key supports only a right-waving gesture, and a left-side imitated key supports only a left-waving gesture. The operation menu is rightward or leftward switched (rotated) when any one of the function selection blocks is not selected. A forward-direction function key is sent when one of the function selection blocks is selected and the user rightward waves his/her arm. On the contrary, a backward-direction function key is sent when one of the function selection blocks is selected and the user leftward waves his/her arm. Take the volume control for example. The volume is turned up when a volume control function (an operation function is set in one of the function selection blocks) is selected and the user rightward waves his/her arm. On the contrary, the volume is turned down when the volume control function is selected and the user leftward wave his/her arm. In addition, the forward-direction function key and the backward-direction key are also sent when the user leftward and rightward waves his/her arms, respectively. It is not limited to the above-mentioned operation.

Figure 7:
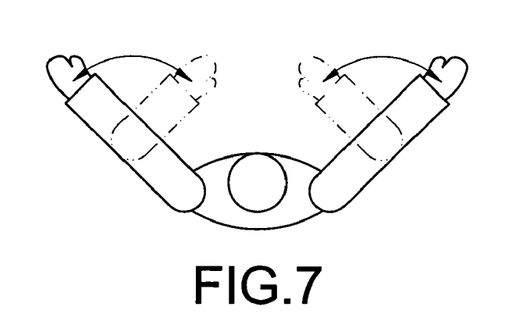
FIG. 7 is a schematic bottom view shows a cancel gesture of raising both arms forward and waving both arms leftward and rightward.

4. The cancel gesture. The cancel gesture can be operated to return to the preceding menu or close the present menu when the user raises both arms forward and waves both arms leftward and rightward (shown in FIG. 7).

Figure 8:
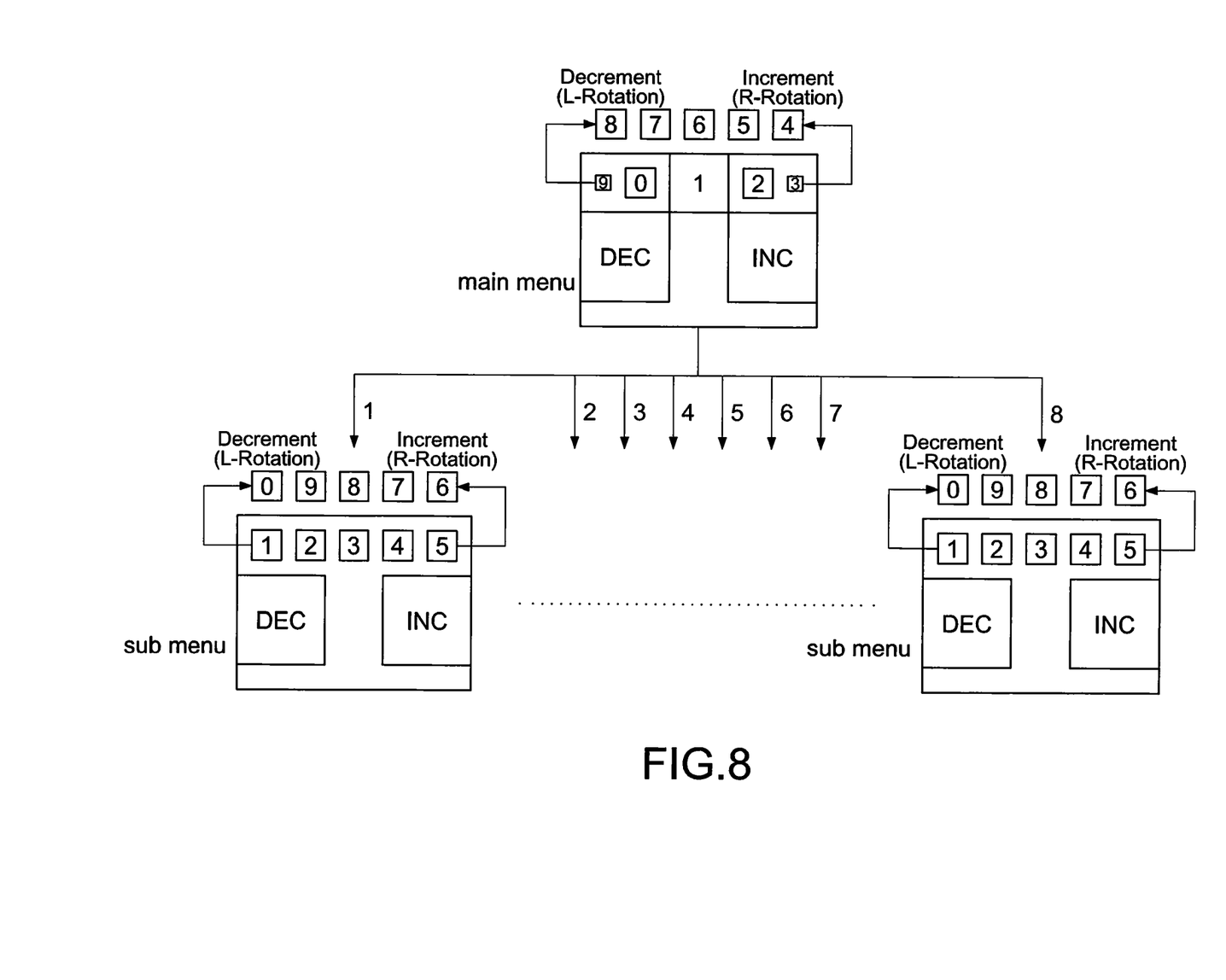
FIG. 8 is a flowchart of executing a menu procedure.

The above-mentioned operation menu of the universal imitated gesture-based remote control system can be switched to a main menu and a sub menu. The main menu is provided to switch appliance options of the controlled electronic appliance and setting options of the remote control system. In the main menu, the function adjustment blocks are operated to switch (rotate) the appliance options when the user leftward or rightward waves his/her arms. More particularly, the appliance options of the controlled electronic appliance are the television, the DVD player, the air conditioner, the computer, or so on. A corresponding sub menu is activated, namely opened, when one of the appliance options of the controlled electronic appliance is selected. Furthermore, the main menu can be closed when the cancel gesture is operated. The sub menu is provided to switch operation options of the corresponding appliance options. In the sub menu, the operation options in the function selection blocks can be selected to operate, further the operation of the operation option can be canceled. The operation options (such as a volume control, a channel selection, or a color regulation) of the controlled electronic appliance can be switched (rotated) when any one of the function selection blocks are not selected and one of the imitated touched keys in the function adjustment blocks is clicked. In addition, the forward-direction function key or the backward-direction function key is sent when one of the function selection blocks is selected and one of the imitated touched keys in the function adjustment blocks is clicked. The sub menu can be operated to return to the main menu when the cancel gesture is operated (shown in FIG. 8).

The main menu has to be closed and the position gesture (the user raises both arms leftward and rightward and waves both arms upward and downward) is operated again when another user want to operate the gesture-based remote control system. Hence, only one user can operate the remote control system at the same time, namely, only one user can be captured in visible area by the camera module.

Figure 1:
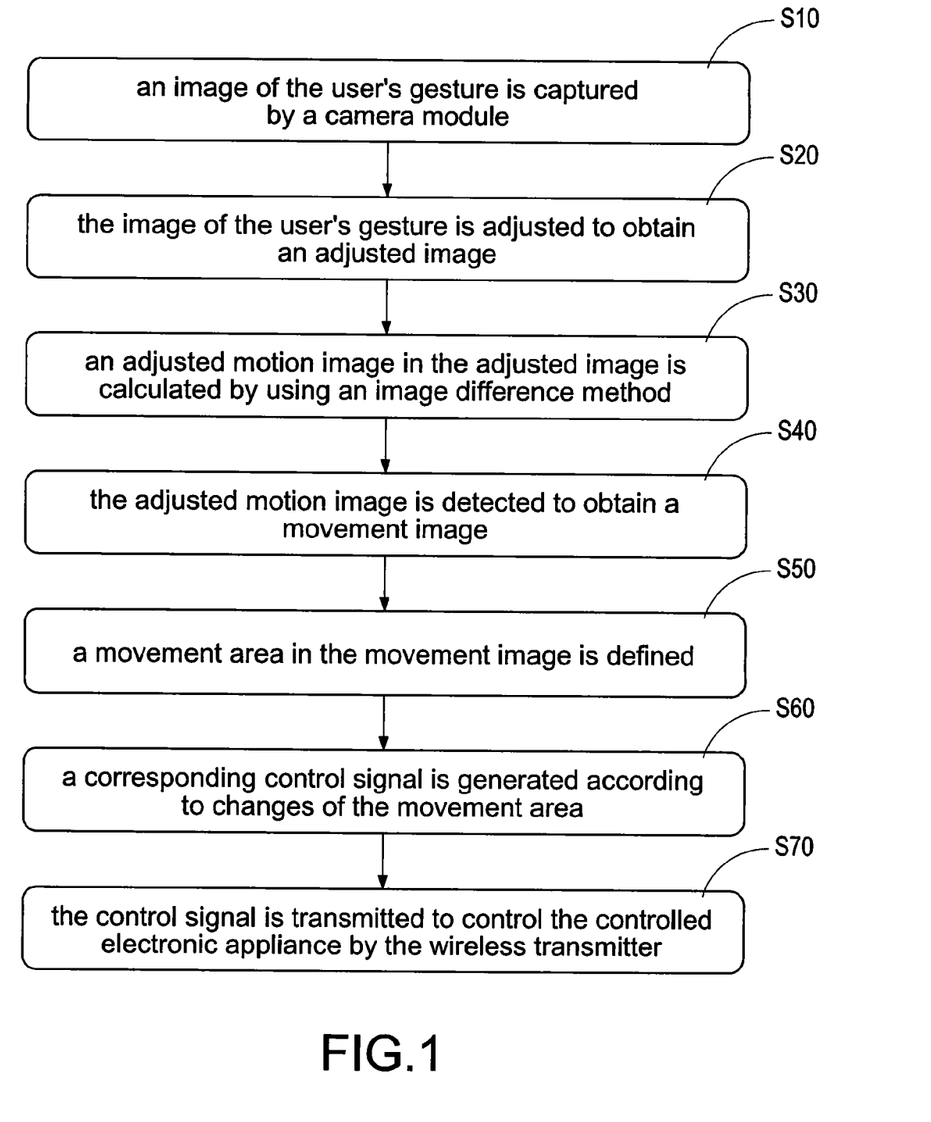
FIG. 1 is a flowchart of a method for controlling a gesture-based remote control system according to the present invention.

Reference is made to FIG. 1 which is a flowchart of a method for controlling a gesture-based remote control system according to the present invention. The gesture-based remote control system is provided to control a controlled electronic appliance by detecting an image of a user's gesture. The controlled electronic appliance can be a television, a DVD player, an air conditioner, a computer, or so on. Firstly, the image of the user's gesture is captured by a camera module (S10). Afterward, the image of the user's gesture is adjusted to obtain an adjusted image (S20). Afterward, an adjusted motion image in the adjusted image is calculated by using an image difference method (S30). Afterward, the adjusted motion image is detected to obtain a movement image (S40). Afterward, a movement area in the movement image is defined (S50). Afterward, a corresponding control signal is generated according to changes of the movement area (S60). Finally, the control signal is transmitted to control the controlled electronic appliance by the wireless transmitter (S70). The detailed description of the method for controlling the gesture-based remote control system will be given as follows.

The step S20 of adjusting the image of the user's gesture to obtain an adjusted image includes following sub-steps: (1) to adjust processed size of the image of the user's gesture; (2) to transform colors of the image of the user's gesture (from 24-bit full-color image to 8-bit gray-level image); and (3) to filter speckle noises of the image of the user's gesture. More particularly, speckle noises of the image of the user's gesture can be filtered by an image low pass filter.

Figure 2:
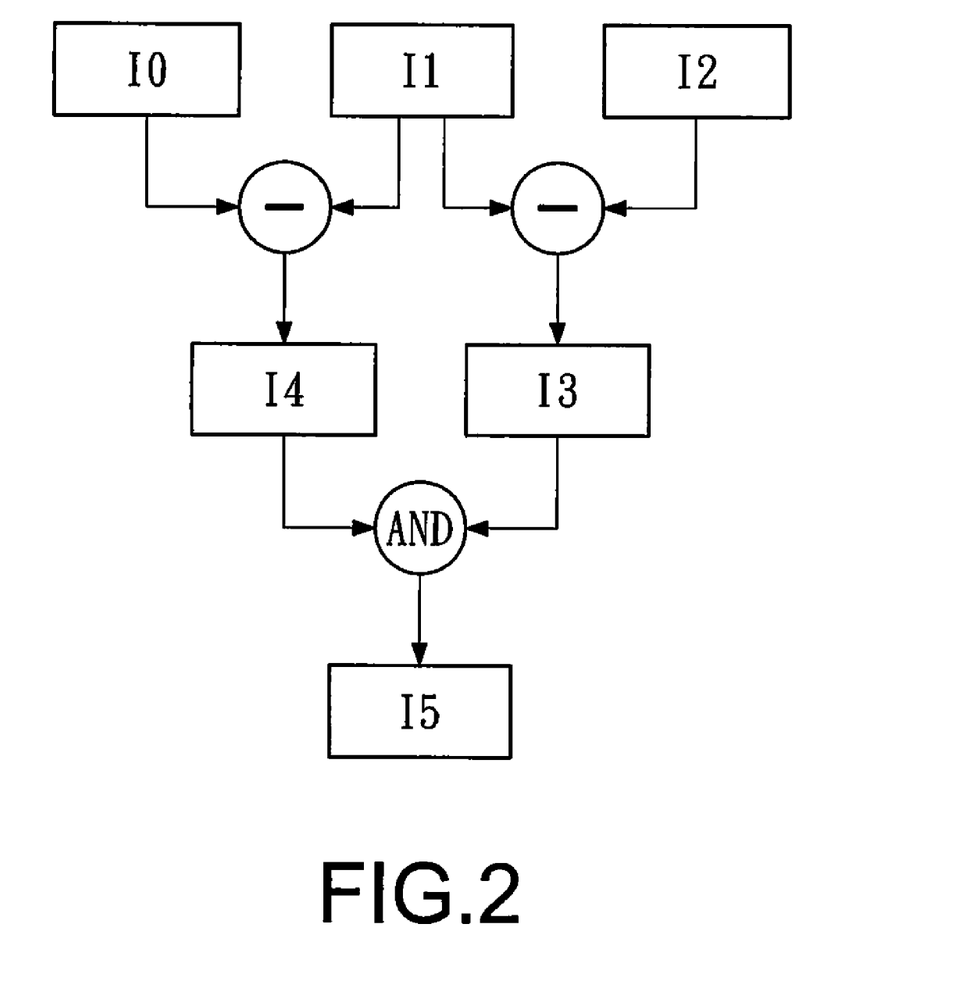
FIG. 2 is a schematic view of using an image difference method.

The step S30, the adjusted motion image in the adjusted image is calculated by using an image difference method. Reference is made to FIG. 2 which is a schematic view of using an image difference method. In order to obtain better performance, three continuous gesture images are provided to calculate the adjusted motion image. The three continuous gesture images (the image of the user's gesture) are a current grey-level image I2, a preceding grey-level image I1 before the current grey-level image I2, and a pre-preceding grey-level image I0 before the preceding grey-level image I1, respectively. A first gray-level threshold value and a second gray-level threshold are set for converting the grey-level image into a binary image. Firstly, the current grey-level image I2 is subtracted by the preceding grey-level image I1 to obtain a first grey-level image (not shown). Afterward, a grey value of each pixel of the first grey-level image is compared to the first gray-level threshold value. A pixel is set as a bright pixel when the grey value of the pixel is greater than or equal to the first gray-level threshold value; on the contrary, a pixel is set as a dark pixel when the grey value of the pixel is less than the first gray-level threshold value. Hence, a first binary image I3 is composed of the bright pixels and the dark pixels. In the same way, the preceding grey-level image I1 is subtracted by the pre-preceding grey-level image I0 to obtain a second grey-level image (not shown). Afterward, a grey value of each pixel of the first grey-level image is compared to the second gray-level threshold value. A pixel is set as a bright pixel when the grey value of the pixel is greater than or equal to the second gray-level threshold value; on the contrary, a pixel is set as a dark pixel when the grey value of the pixel is less than the second gray-level threshold value. Hence, a second binary image I4 is composed of the bright pixels and the dark pixels. Finally, a logic AND operation is performed between the first binary image I3 and the second binary image I4 to produce a third binary image I5, that the third binary image I5 is the adjusted motion image. Hence, positions of the images of the user's gesture can be detected.

Figure 3:
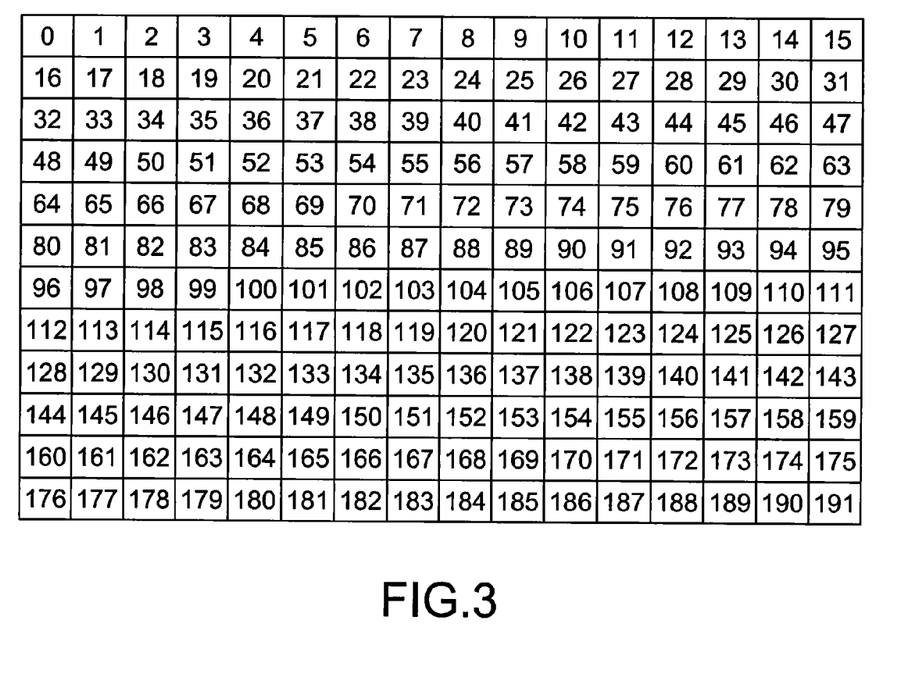
FIG. 3 is a schematic view of a plurality of division sections.

The detailed description of the step S40 is given as follows. Firstly, the third binary image I5 is divided into a plurality of division sections (shown in FIG. 3). A movement threshold is set to determine whether each of the division sections is a movement section or not. In a preferred embodiment, the division section is set as a bright section when the amount of motion pixels of the division section is greater than the movement threshold, namely, the division section is regard as the movement section. On the contrary, the division section is set as a dark section when the amount of motion pixels of the division section is less than the movement threshold, namely, the division section is not regard as the movement section. For example, an image with 160*120 pixels is divided into 192 (16*12=192) division sections; namely, each of the division sections has 100 ((160/16)*(120/12)=100) pixels. It is assumed that the movement threshold is set to 50. The division section is the movement section when the amount of the motion pixels in one division section is greater than the movement threshold. Hence, a gross motion or a slight motion can be filtered to reduce the possibility of incorrect operations.

Figure 4:
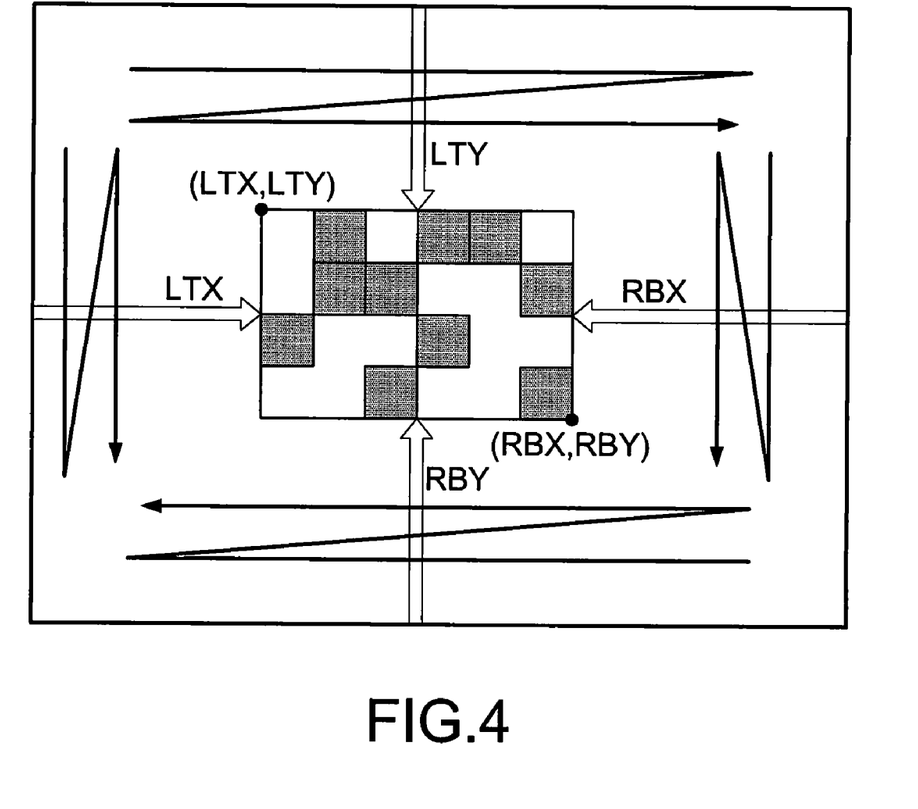
FIG. 4 is a schematic view of searching a direction of a movement area.

The detailed description of the step S50 is given as follows. The coordinate boundary of a movement area in the movement image is defined as (LTX, LTY) to (RBX, RBY), as shown in FIG. 4. The top edge of the movement area, LTY, is set when the movement section is firstly detected from top to bottom and from left to right in the movement image. Also, the bottom edge (RBY), left edge (LTX), and right edge (RBX) of the movement area are set in analogous ways, respectively. The movement section is not be detected or area of the movement section is too small when the coordinate boundary of the movement area is (0,0) to (0,0). Hence, the operation menu (the main menu and the sub menu included) is automatically closed when an elapsed time exceeds a setting time.

As mentioned above, the gesture-based remote control system judges the user's gesture to a location gesture, a click gesture, a slide gesture, and a cancel gesture. The click gesture is a time-independent gesture, however, the slide gesture, the location gesture, or the cancel gesture are time-dependent gestures. In order to recognize types of these gestures, the recent coordinate and size of the movement area need to be recorded. The click gesture is recognized to provide the click command when the movement area overlaps a click defined area. The slide gesture is recognized when the movement area continually moves in a designated direction (such as laterally, lengthwise, or sidelong moves). More particularly, the movement area continually moves laterally, namely, the movement continually moves leftward or rightward. The increment command is provided when the movement area rightward moves in the function adjustment blocks continually; on the contrary, the decrement command is provided when the movement area leftward moves in the function adjustment blocks. The cancel gesture is generated when the movement area makes laterally continuously changes (shown in FIG. 7). The position gesture is generated when the movement area makes lateral-to-lengthwise or lengthwise-to-lateral changes (shown in FIG. 5). However, a moving object passes through lens of the camera module to generate abnormal disturbance when the movement area is too large or the movement area makes lengthwise continuously changes. Also, other undefined or unrecognized gesture operations are invalid.

Figure 9:
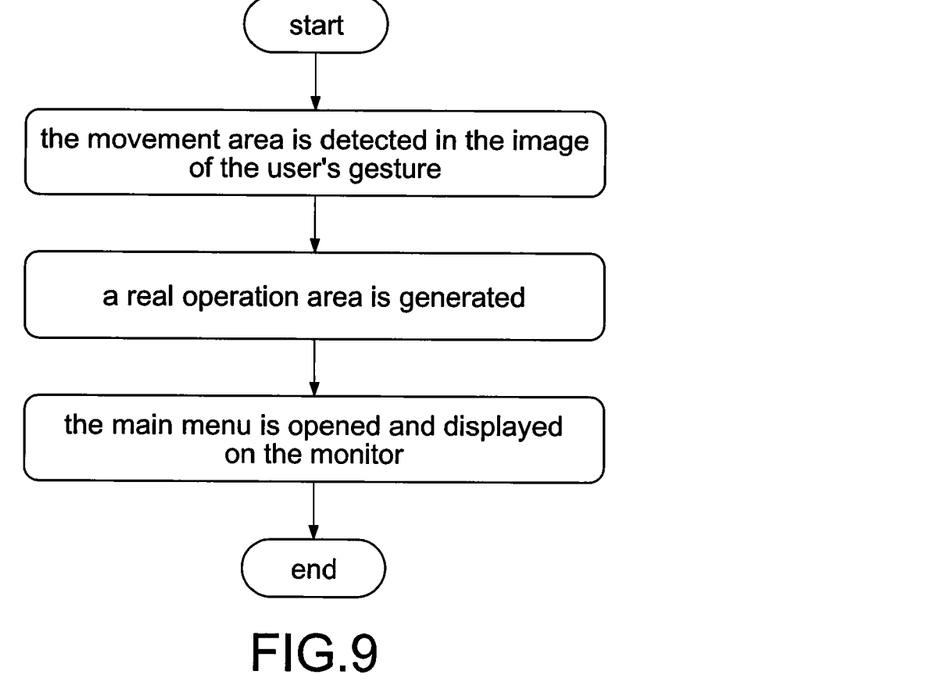
FIG. 9 is a flowchart of executing a position procedure.

The detailed description of the step S60 is given as follows:

1. The position gesture can be operated in both the main menu and the sub menu. In addition, the position gesture is detected according to the movement area to generate a real operation area. The main menu is opened and displayed on the monitor. The position procedure is shown in FIG. 9.

Figure 10:
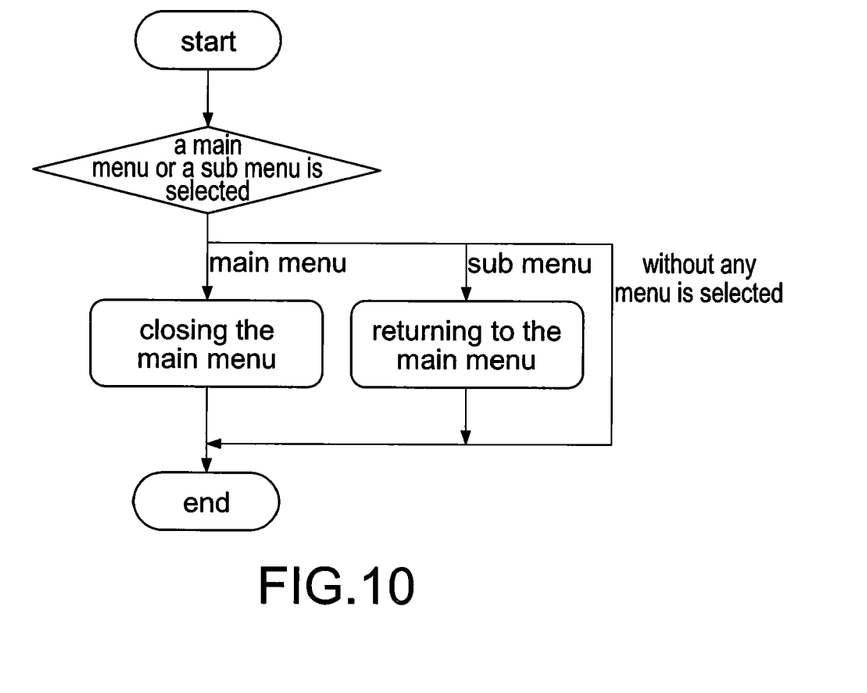
FIG. 10 is a flowchart of executing a cancel procedure.

2. The cancel gesture can be operated in both the main menu and the sub menu to return to the preceding menu or close the present menu. The cancel procedure is shown in FIG. 10

Figure 11:
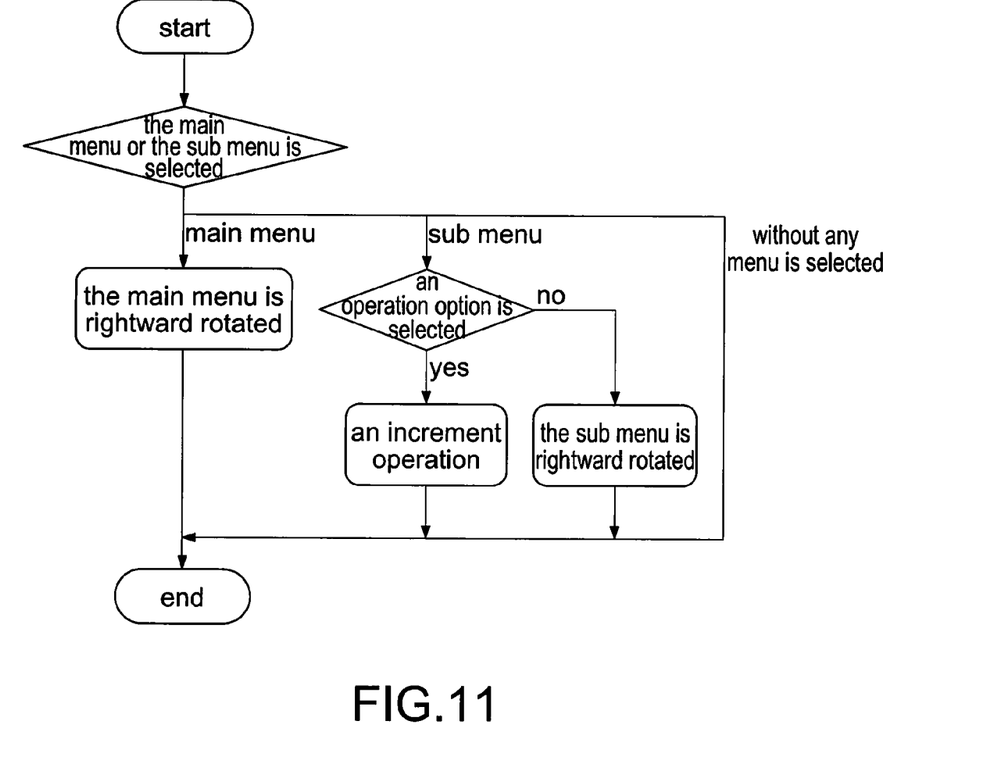
FIG. 11 is a flowchart of executing an increment procedure.

3. The increment slide gesture (further called an increment gesture) can be operated in both the main menu and the sub menu. The appliance options in the function selection blocks are rightward switched (rotated) when the increment gesture is operated in the main menu. The operation options is rightward switched (rotated) when the increment gesture is operated in the sub menu and one of the operation options is not selected. In addition, an increment function is operated when the increment gesture is operated in the sub menu and one of the function options is selected. The increment slide procedure is shown in FIG. 11.

Figure 12:
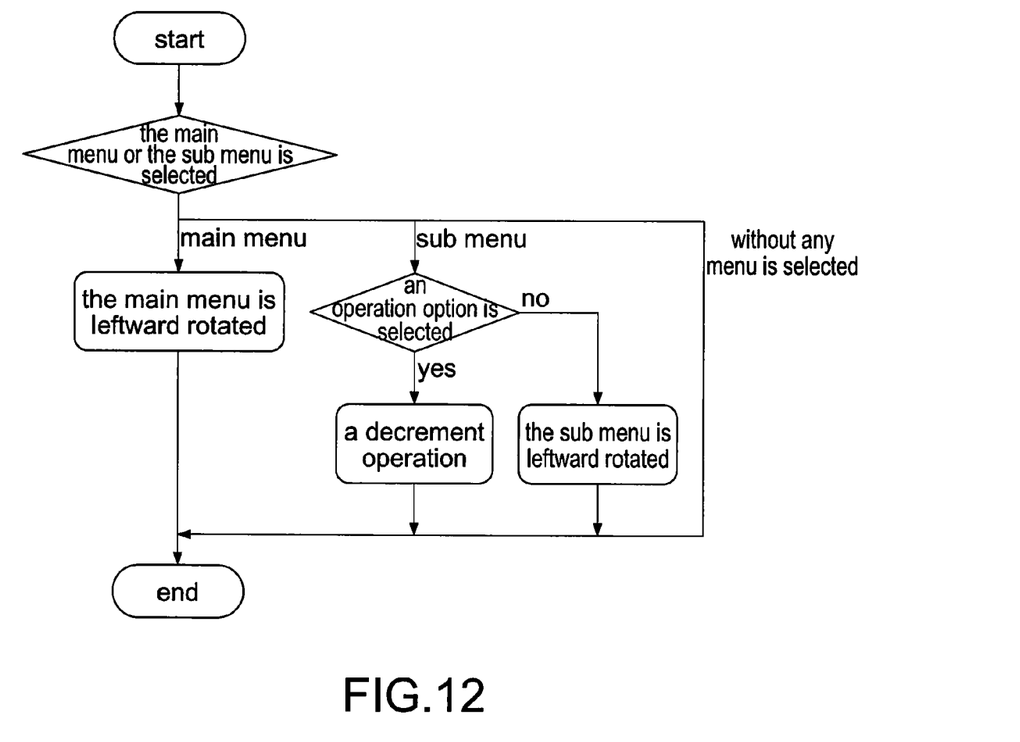
FIG. 12 is a flowchart of executing a decrement procedure.

4. The decrement slide gesture (further called a decrement gesture) is similarly operated to the increment gesture. The differences between the increment gesture and the decrement gesture are that the switched (rotated) direction and some amount are opposite. The decrement slide procedure is shown in FIG. 12.

Figure 13:
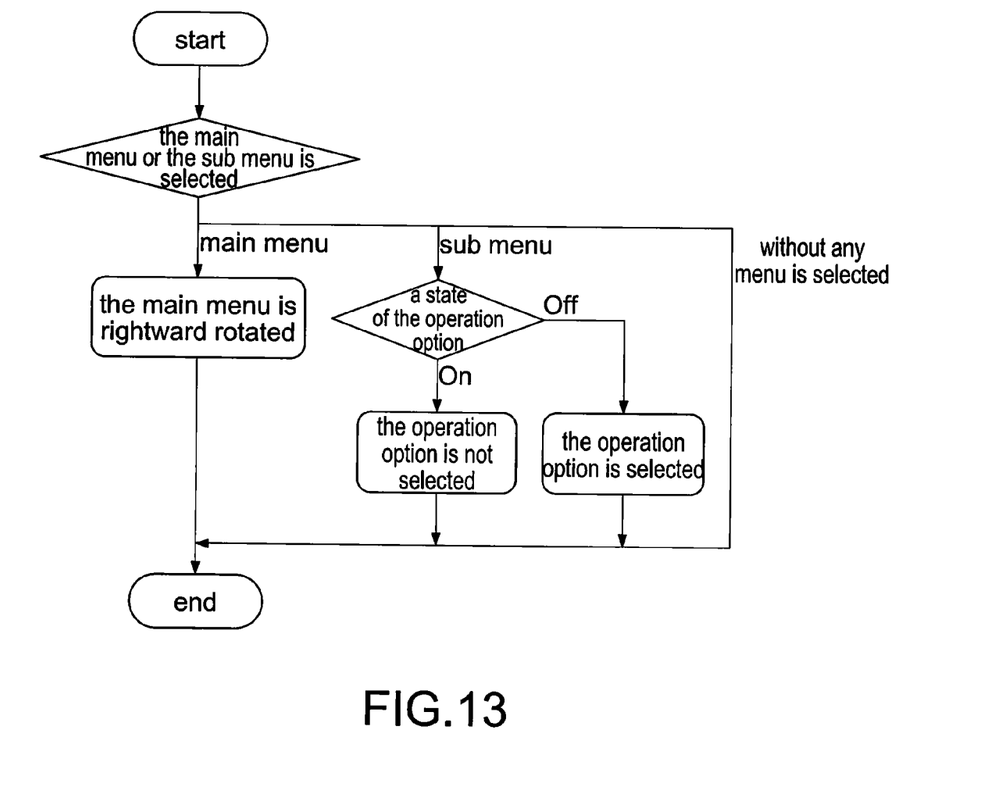
FIG. 13 is a flowchart of executing a click procedure.

5. The click gesture can be operated in both the main menu and the sub menu. A selection of the function selection blocks is valid when the click gesture is operated in the main menu and one of the function selection blocks is exactly selected. The operation option selected is enabled when the click gesture is operated in the sub menu, and further the operation option selected is disabled when the click gesture is operated again. Moreover, the present operation option is closed when another operation option is selected. Hence, only one of the operation options is operated at the same time. The click procedure is shown in FIG. 13.

In conclusion, the present invention has the following features:

1. The user's skin color, dress and adornment, and complexity of the environmental background are not limited for operating the gesture-based remote control system. Also, users can manually operate the non-contact mouse apparatus without holding any objects with special colors or patterns, hand-held lighting device, wearing any special data gloves, or operating by special gestures.

2. The gesture-based remote control system is provided to combine with a traditional TV or a digital TV to make the tradition TV or the digital TV as a multi-function universal remote control. The contents of the operation menus can be directly displayed on the monitor of the TV and the operation menus are operated to control various electronic appliances by just using user's gestures without any physical remote controls.

3. The defined operation options can be easily selected because the operation locations of the operation menus are located near the user. Also, simple arm action, such as leftward or rightward waves the arm can fulfill the operation of switching (rotating) operation options and sending the forward-direction function key and the backward-direction function key.

4. The cyclic menu is adopted to contain more operation options and further be more user-friendly and intuitive.

5. The excessively-large movement area is automatically filtered to exclude incorrect moving objects.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for controlling a gesture-based remote control system, and a controlled electronic application controlled by detecting gestures of a user, the method comprising the steps of:
   (a) detecting an image of a user's gesture;
   (b) detecting bounds of a movement area in the image of the user's gesture;
   (c) judging the user's gesture as an adjusted gesture when the movement of the movement area is continual in a designated direction; and
   (d) transmitting a key control command corresponded to the adjusted gesture through a wireless transmitter;
   wherein in the step (b) further comprising the steps of:
      (b1') adjusting the image of the user's gesture to obtain an adjusted image;
      (b2') calculating the adjusted image by using an image difference method to obtain an adjusted motion image, the image difference method including the steps of:
         using three continuous gesture images to calculate the adjusted motion image, the three continuous gesture images being a current grey-level image, a preceding grey-level image and a pre-preceding grey-level image, the preceding grey-level image being an image before the current grey-level image and the pre-preceding grey-level image being an image before the preceding grey-level image,
         converting the grey-level images into a binary image by using a first gray-level threshold value and a second gray-level threshold value, the current grey-level image being subtracted by the preceding grey-level image to obtain a first grey-level image,
         comparing a grey value of each pixel of the first grey-level image to the first gray-level threshold value, being set as a bright pixel when the grey value of the pixel is greater than or equal to the first gray-level, threshold value and a pixel being set as a dark pixel when the grey value of the pixel, is less than the first gray-level threshold value, wherein a first binary image is composed of the bright pixels and the dark pixels
         subtracting a preceding grey-level image by the pre-preceding grey-level image to obtain a second grey-level image
         comparing a grey value of each pixel of the first grey-level image to the second gray-level threshold value and setting the pixels as bright pixels or dark pixels to form a second binary image; and
         comparing the first binary image and the second binary image to produce a third binary image and thereby detect images of the user's gesture;
      (b3') detecting the adjusted motion image to obtain a movement image; and
      (b4') defining a movement area in the movement image, the movement area boundaries being determined to define the movement area, a click gesture being recognized to provide a click command when the movement area overlaps a click defined area and a slide gesture being recognized when the movement area continually moves in a designated direction.

2. The control method in claim 1, wherein the controlled electronic application is a television, a DVD player, an air conditioner, or a computer.

3. The control method in claim 1, wherein the key control command corresponded to the adjusted gesture includes an increment key control command and a decrement key control command.

4. The control method in claim 1, wherein the step (c) that the movement area continually moves in a designated direction means the movement area continually moves in a lateral direction.

5. The control method in claim 4, wherein the lateral direction is a leftward direction or a rightward direction.

6. The control method in claim 1, after the step (b) further comprising the step of:
   (b1) judging a position gesture when the movement area transits from lateral to lengthwise or lengthwise to lateral changes.

7. The control method in claim 6, after the step (b1) further comprising the steps of:
   (b2) displaying an operation menu with a plurality of operation options;
   (b3) setting a click defined block corresponded to the operation menu;
   (b4) judging a click gesture when the movement area overlaps the click defined block; and
   (b5) transmitting an option signal corresponded to the click gesture through a wireless transmitter to select an operation option.

8. The control method in claim 7, wherein the step (c) further comprising the steps of:
   (c1) judging a cancel gesture when the movement area continually move in a lateral direction; and (c2) transmitting a key control command corresponded to the cancel gesture through a wireless transmitter.

9. The control method in claim 1, wherein the step (c) further comprising:
 (b11) adjusting processed size of the image of the user's gesture to a predetermined size;
 (b12) transforming colors of the image of the user's gesture; and
 (b13) filtering speckle noises of the image of the user's gesture.

10. The control method in claim 9, wherein the step (b12) transforms colors of the image of the user's gesture from the 24-bit full-color image to the 8-bit gray-level image.

\* \* \* \* \*